United States Patent [19]
Appleton

[11] 3,831,922
[45] Aug. 27, 1974

[54] SHOCK ABSORBER
[75] Inventor: Bernard Simon Appleton, Hewlett, N.Y.
[73] Assignee: Unilan A.G., Chur, Switzerland
[22] Filed: Oct. 6, 1972
[21] Appl. No.: 295,539

[52] U.S. Cl. .............................. 267/140, 267/152
[51] Int. Cl. ............................................... F16f 7/12
[58] Field of Search ........... 267/153, 152, 140, 141, 267/63

[56] References Cited
UNITED STATES PATENTS
2,686,667   8/1954   Willison et al. ..................... 267/153
3,231,256   1/1966   Olson ................................. 267/153
3,606,295   9/1971   Appleton ........................... 267/140

*Primary Examiner*—James B. Marbert
*Attorney, Agent, or Firm*—Clelle W. Upchurch

[57] ABSTRACT

A cushioning device particularly well suited for use in a draft gear of a railway vehicle comprises a plurality of rigid plates disposed one over the other and having symmetrically disposed non-porous elastomeric protuberances on each face thereof with interstices between the protuberances being filled with an elastomeric plastic foam which binds the elements together into a unitary structure.

9 Claims, 4 Drawing Figures

SHOCK ABSORBER

This invention relates generally to energy absorbing devices, and more particularly to an elastomeric shock absorbing device having improved modulus, damping characteristics and compression set especially advantageous for use in automatic coupling devices for railway vehicles.

A cushioning device for use in railway car draft gears is disclosed in U.S. Pat. Nos. 2,640,603 and 2,686,667. The cushioning device is composed of a plurality of elements having a sheet metal core between rubber surfaces vulcanized to each side thereof. The rubber has an undulated surface of alternate hills and valleys which extend in one direction across the element. The rubber of the hills displaces into the adjacent valleys under compression until the valleys are filled at which point the rubber surface is substantially a solid block of rubber. Further compression often results in rupture of the rubber.

A shock absorber having rubber discs stacked one on the other and bound together with a flexible polymeric foam column extending longitudinally through the stacked discs is disclosed in my U.S. Pat. No. 3,606,295. Such a device combines the shock absorbing characteristics of a separate column of foam material and rubber and is adapted for use as a shock absorber in vehicle bumpers and wheel suspension systems. However, it may not always function satisfactorily in devices under the load associated with railway vehicles coupled together in tandem.

Another shock absorber which combines rubber and a core of polymeric foam is disclosed in U.S. Pat. No. 3,610,610. The disclosed mounting has an annular rubber element and a polymeric foam core confined between rigid end pieces. Such a device is recommended by the patentee as a machine mounting for absorbing vibrations but it is not suitable for use in an automatic coupling device for railway vehicles or the like.

It is therefore an object of this invention to provide an improved energy absorbing device which is adapted for use as a shock absorber in association with various types of vehicles. Another object of the invention is to provide an elastomeric shock absorber or spring element having improved damping characteristics. A further object of the invention is to provide a novel and improved shock absorbing device combining the elastic properties of a flexible plastic foam with the damping properties of rubber. A still further object of the invention is to provide a shock absorber adapted for compression and displacement of rubber without rupture under heavy loads.

Other objects will become apparent from the following description with reference to the accompanying drawing wherein.

Figure 1:
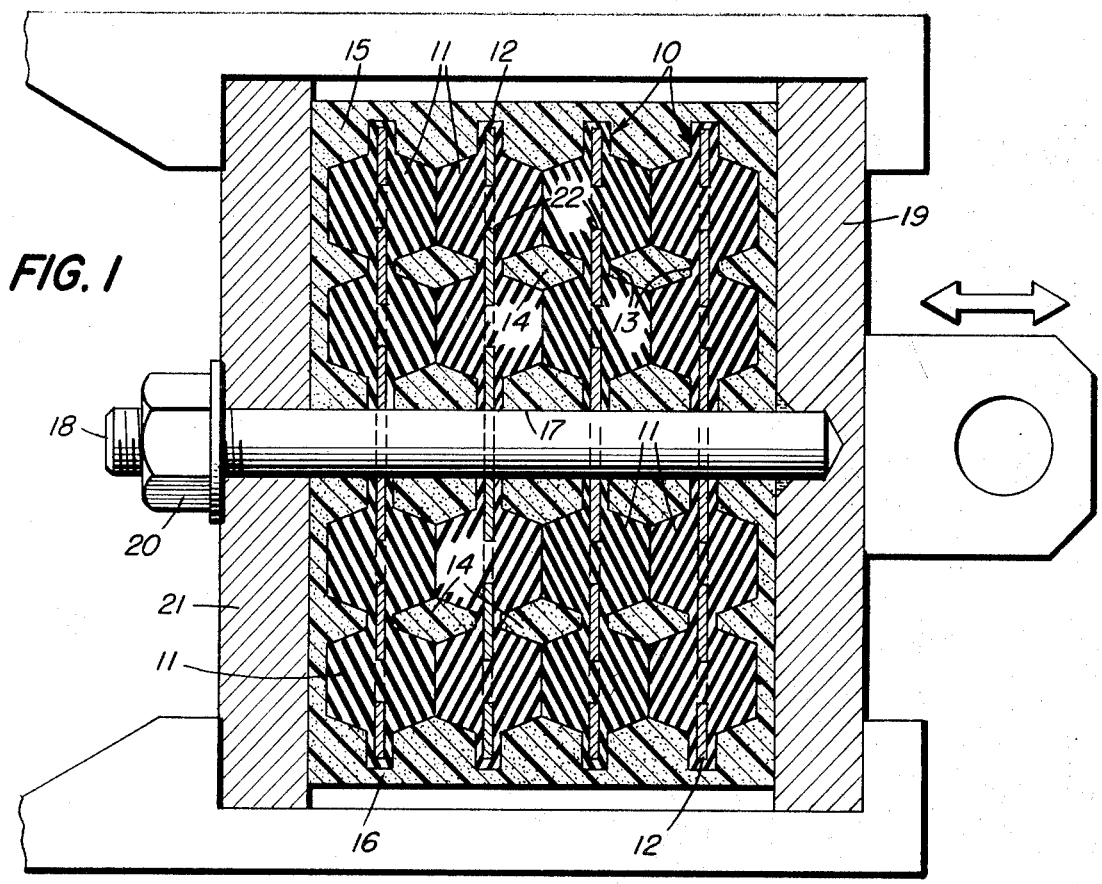
FIG. 1 is a longitudinal section of one embodiment of the invention in association with a typical shock absorber assembly.

The foregoing objects and others are accomplished in accordance with this invention, generally speaking, by providing a plurality of longitudinally spaced rigid plates separated by a plurality of substantially non-porous elastomeric protuberances which act as columnar elements or pillars and a flexible elastomeric plastic foam filling the interstices between the protuberances and binding the plates together to form a unitary structure. The plates may be metal or plastic sheets. The protuberances may be molded rubber vulcanized to the plates and projecting outwardly from each face thereof to form a plurality of spaced frusto-pyramidal or frusto-conical elements which abut similar elements on the face of an adjacent plate in a stack to form rubber supporting columns for the plates. The unit formed by the assembly of rubber elements and plastic foam filler may have a centrally disposed longitudinally extending bore therethrough. The protuberances are preferably uniformly spaced over the surface of the plates to provide a symmetrical structure. The plate may be drilled prior to vulcanization of the elastomer thereon so that the elastomer may extend through the plate whereby protuberant elements on opposite sides of a plate are integral with each other. The cross-section of the holes in the plate is less than the cross-section of the base of the protuberance. The bases of the protuberances are adjacent to the plate. Preferably the vertical edges of the pyramid are rounded.

The shock absorbing unit may be fabricated by compression molding spaced symmetrically disposed rubber protuberances on each face of a suitable metal or plastic sheet and vulcanizing the rubber. The vulcanized molded elements may then be stacked one on the other in a suitable mold having walls which fit snugly about the edges of the molded elements and over the top and bottom faces of the end elements. A foamable plastic composition may then be poured or injected under pressure into the mold into the interstices between the rubber protuberances. Upon foaming of the mixture the interstices are filled with a flexible cellular plastic material. The stack may be provided with a centrally disposed longitudinal bore and foaming mixture may be charged through this bore. If the shock absorber is to have a centrally disposed longitudinal bore, foam filling the core may be removed with a suitable drill. The modulus of the shock absorber may be predetermined and varied from one unit to another by the angle of inclination of the sides of the protuberance with respect to the supporting plate and by the height of the protuberances. By providing a rubber which is discontinuous in both directions across the faces of the rubber elements between the rigid plates, deformation of the rubber is reduced and the assembled unit is capable of supporting more weight without excessive displacement and rupture of the rubber elements. The flexible elastomeric cellular filler between the rubber elements supports them against rupture as they are deformed. The resulting structure has an increased modulus and provides more damping with less compression set than a stack of similar plates having a single rubber protuberance covering each face thereof with air spaces therebetween. Because of the elasticity of the cellular filler in the interstices there is no significant permanent deformation of the rubber pillars.

The plate used for supporting the rubber elements is preferably metal such as a molybdenum steel or the like but it may also be a rigid plastic material such as a polycarbonate, rigid polyurethane or polyester sheet. Any of various flexible elastomeric plastic foams may be used to fill the interstices but it is preferred to use a flexible, high density, micro-cellular polyurethane foam. One suitable polyurethane foam is disclosed in U.S. Pat. No. 2,850,464. Other suitable flexible, microporous, elastomeric polyurethane foams are disclosed in "Polyurethanes: Chemistry and Technology" by Saunders and Frisch, published by Interscience Publishers, (1964), particularly Chapters V, VI and VII. Preferably, the density of the polyurethane foam filler should be from about 18 to about 50 pounds per cubic foot. The rubber or other non-porous elastomeric material molded on the supporting sheet may have a density of from about 55 to about 125 pounds per cubic foot. The preferred density of the rubber is from about 65 to about 95 pounds per cubic foot. Butyl rubber is preferred but natural or other synthetic elastomers such as Neoprene or non-porous resilient polyurethanes may be used. Preferably, a relatively thin rubber coating covers the surface of the rigid sheet between the bases of the protuberances. The walls of the protuberances preferably join the rigid sheet at an inclined angle of from about 5° to about 45°.

Figure 2:
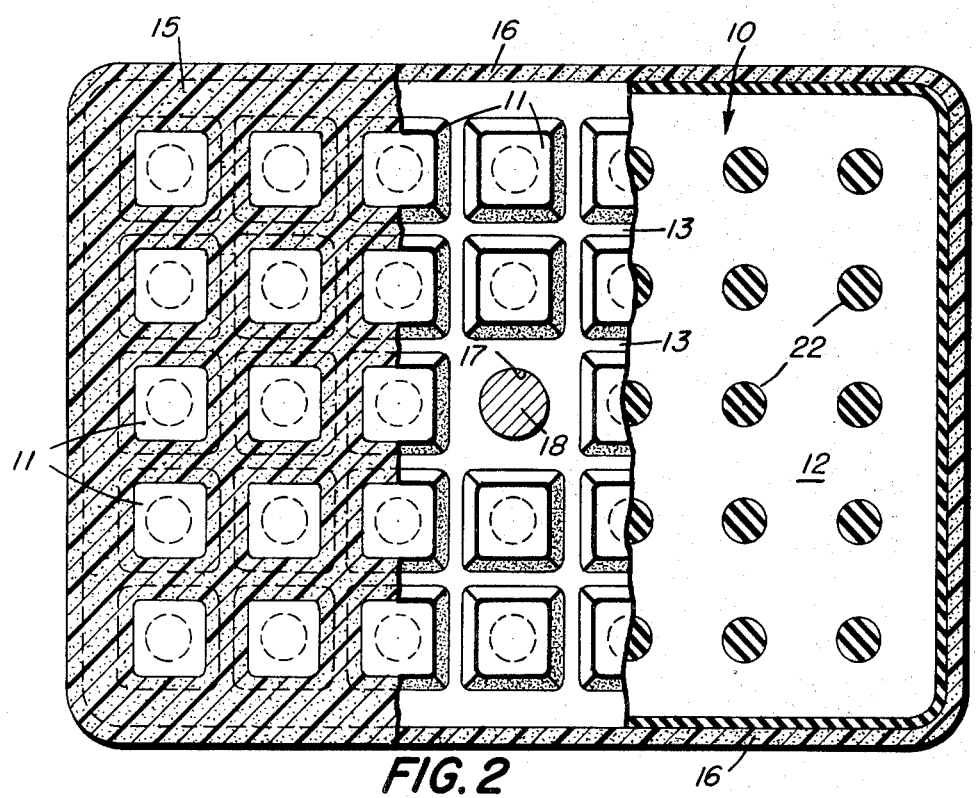
FIG. 2 is a plan view of the embodiment of FIG. 1 with its surface of plastic foam partially removed.
Figure 3:
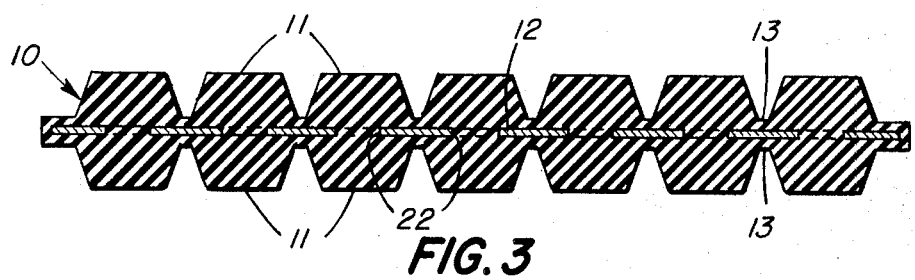
FIG. 3 is a side elevation of an embodiment of one element used in fabricating a pad similar to the one illustrated in FIG. 1.

Referring now to the drawing, a member 10 formed by compression molding and vulcanizing butyl rubber frusto-pyramidal shaped protuberances 11 on a metal support 12 through openings 22 is illustrated in FIG. 3. A rubber coating 13 bridges the space between protuberances 11. The rectangular elements 10 may be stacked one on the other in a suitable box-shaped mold which fits snugly about all sides of the stack. A liquid mixture of components which react chemically and expand to form an elastomeric polyurethane foam may be poured or injected into the axially disposed aligned openings 14 between protuberances 11. Care is taken to be sure that liquid reaction mixture enters all of the interstices 14 between the rubber protuberances which abut at their apices. Upon foaming, a microporous elastomeric polyurethane 15 fills the interstices 14 and binds the rubber elements together into a unitary block as illustrated in FIGS. 1 and 2. An axial bore 17 may be drilled through the block to remove the polyurethane and form an opening for a rod 18 secured at one end in plate 19 and threaded at the opposite end. A bolt 20 secures plate 21. A relatively thin coating 16 of foam may be provided about the stack of plates to provide the block with a surface coating and a smooth external surface. The product may be parallelipiped shaped as illustrated, cylindrical, or it may have a polygonal cross-section such as hexagonal or octagonal, if desired.

Figure 4:
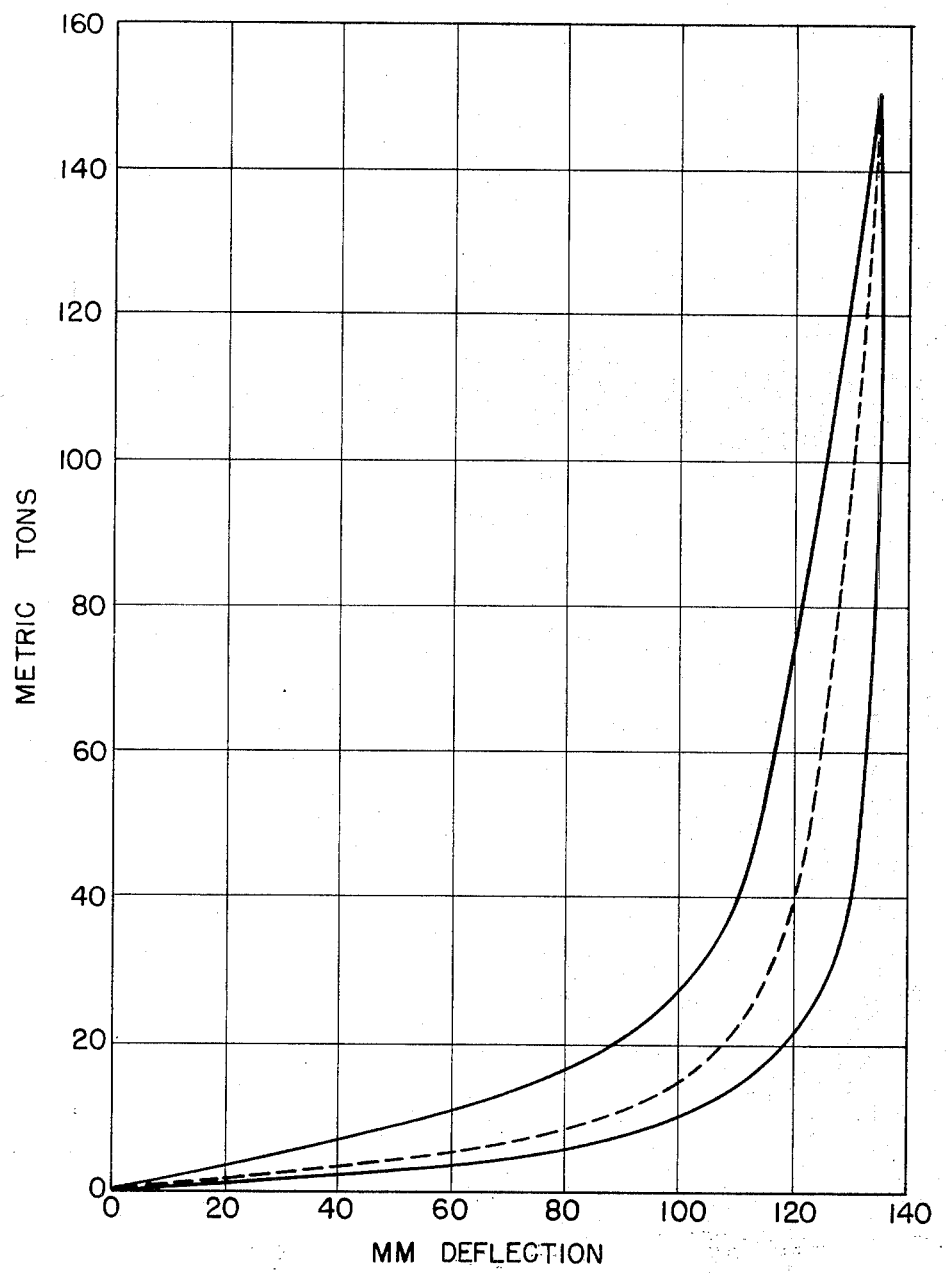
FIG. 4 is a graph which illustrates the compression and release curves produced when a pad similar to that of FIG. 1 is compressed on a static test machine.

FIG. 4 illustrates the deflection of a cylindrical embodiment otherwise similar to the one illustrated in FIG. 3 but having sixteen rigid plates. In developing the deflection curve, the block was compressed on a static test machine by applying a compressive force substantially perpendicularly to the faces of the metal plates. The curve to the left in FIG. 4 illustrates the number of millimeters the block was compressed plotted against metric tons compressive force. The curve to the right of FIG. 4 is the force exerted by the compressed block plotted against millimeters expansion as the block expands after release of the compressive force. The block was compressed about 24 millimeters before the pressure in metric tons was measured. It is apparent from FIG. 4 that the useful stroke of the pad was 110 millimeters under 150 tons and the useful stroke under traction was 48 millimeters under 70 tons. Work stored under compression was 3,509 kg meters and work restored was 1,236 kg meters while the work dissipated was 2,273 kg meters. Damping was about 25 percent. The dotted line in FIG. 4 represents the force which would be exerted if the block only contained rubber protruberances. In other words, it represents the force which would be exerted if foam were eliminated from the structure.

A shock absorber embodying the cushioning pad of this invention, or a plurality thereof disposed one over the other, can be repeatedly compressed and released without rupture of the rubber and without separation of one element from the other. The shock absorbing characteristics of a device can be easily increased or decreased by choice of number of rigid plates with their rubber elements. Because of these features the shock absorber may be used in various types of vehicles as a spring element or to absorb the shocks of impact. However, up to this time, it has been found most advantageous for installation in the pocket of a railway car draft gear as described in more detail in my copending application filed on the same date and entitled "Draft Gear."

Although the invention has been described in detail for the purpose of illustration, it is to be understood that such detail is solely for that purpose and that variations can be made therein by those skilled in the art without departing from the spirit and scope of the invention except as it may be limited by the claims.

The embodiments of the invention in which an exclusive property or privilege is claimed are defined as follows:

1. A shock absorber comprising rigid plates disposed in face-to-face relationship, a plurality of laterally spaced rows of longitudinally spaced substantially non-porous elastomeric protuberances symmetrically arranged over each plate with each of the protuberances on one side of the plate being directly opposite a protuberance on the other side of the plate, the said protuberances being secured at one end to the plate and abutting at the other end protuberances carried by an adjacent plate, and an elastomeric plastic foam filling the said spaces between the rows and filling the spaces in the rows between the protuberances and binding the plates together into a unitary structure.

2. The shock absorber of claim 1 wherein there is an opening in the plate between protuberances which are opposite each other on the opposite faces of the plate and the opening is filled with substantially non-porous elastomer which joins oppositely disposed protuberances together into an integral structure.

3. The shock absorber of claim 2 wherein the said protuberances are substantially frusto-pyramidal shaped with their bases secured to the plate and their apexes abutting apexes of an adjacent plate and the plastic foam is a micro-porous elastomeric polyurethane foam.

4. The shock absorber of claim 1 wherein the protuberances are substantially frusto-pyramidal shaped rubber with their bases secured to a plate and the foam is a microporous, elastomeric polyurethane foam.

5. The shock absorber of claim 4 having a bore extending longitudinally therethrough.

6. The shock absorber of claim 1 wherein the plates are metal, the protuberances are rubber and substantially frusto-pyramidal shaped and the foam is a polyurethane foam having a density of from about 18 to about 50 pounds per cubic foot.

7. The shock absorber of claim 6 having an axial bore extending longitudinally therethrough.

8. The shock absorber of claim 7 wherein the protuberances are evenly spaced in rows which substantially cover the face of the plate.

9. The shock absorber of claim 1 wherein there is an opening at the base of each protuberance in each rigid plate and the bases of protuberances on opposite sides of the plate are integral with each other.

* * * * *